(12) United States Patent
Chiproot

(10) Patent No.: US 10,260,668 B2
(45) Date of Patent: Apr. 16, 2019

(54) METHOD FOR PIPE COUPLING ENCAPSULATION

(71) Applicant: Eliezer Krausz Industrial Development Ltd., Tel Aviv (IL)

(72) Inventor: Avi Chiproot, Kfar-Saba (IL)

(73) Assignee: Krausz Industries Ltd., Tel Aviv (IL)

( * ) Notice: Subject to any disclaimer, the term of this patent is extended or adjusted under 35 U.S.C. 154(b) by 0 days.

(21) Appl. No.: 15/430,499

(22) Filed: Feb. 12, 2017

(65) Prior Publication Data
US 2018/0231169 A1 Aug. 16, 2018

(51) Int. Cl.
*F16L 55/172* (2006.01)
*F16L 55/178* (2006.01)

(52) U.S. Cl.
CPC ........... *F16L 55/172* (2013.01); *F16L 55/178* (2013.01)

(58) Field of Classification Search
CPC .............................. F16L 55/172; F16K 55/178
USPC ............................................. 138/99; 137/318
See application file for complete search history.

(56) References Cited

U.S. PATENT DOCUMENTS

| 4,111,234 | A | * | 9/1978 | Wells et al. | F16L 55/172 138/167 |
| 5,007,666 | A | * | 4/1991 | Kyfes | B29C 65/58 138/162 |
| 5,219,001 | A | * | 6/1993 | Rennaker | F16L 55/172 138/97 |
| 5,288,108 | A | * | 2/1994 | Eskew et al. | F16L 55/172 138/99 |
| 6,830,268 | B2 | * | 12/2004 | Krausz et al. | F16L 55/172 138/99 |
| 7,731,242 | B2 | * | 6/2010 | Coscarella | F16L 21/005 137/315.29 |
| 2014/0000743 | A1 | * | 1/2014 | Biery et al. | F16L 55/172 138/99 |

* cited by examiner

*Primary Examiner* — Kevin Lee
(74) *Attorney, Agent, or Firm* — Dekel Patent Ltd.; David Klein

(57) ABSTRACT

A method for pipe coupling encapsulation includes placing two elastomeric partial rings around pipes on opposite sides of a leaking joint coupling, taking a repair coupling, which includes a band and opposing clamp members extending outwards from ends of the band, and placing the band around the leaking joint coupling such that opposite end portions of the band overlie the elastomeric partial rings, and tightening the opposing clamp members towards each other with one or more tightening elements.

8 Claims, 2 Drawing Sheets

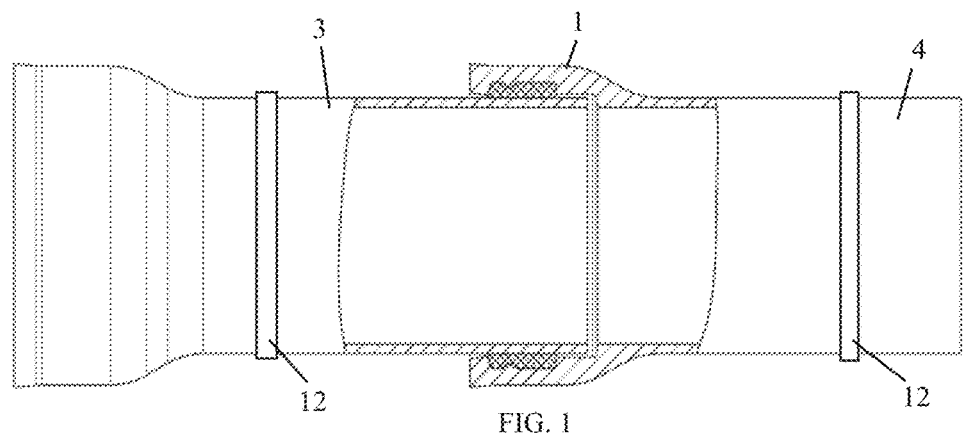
FIG. 1
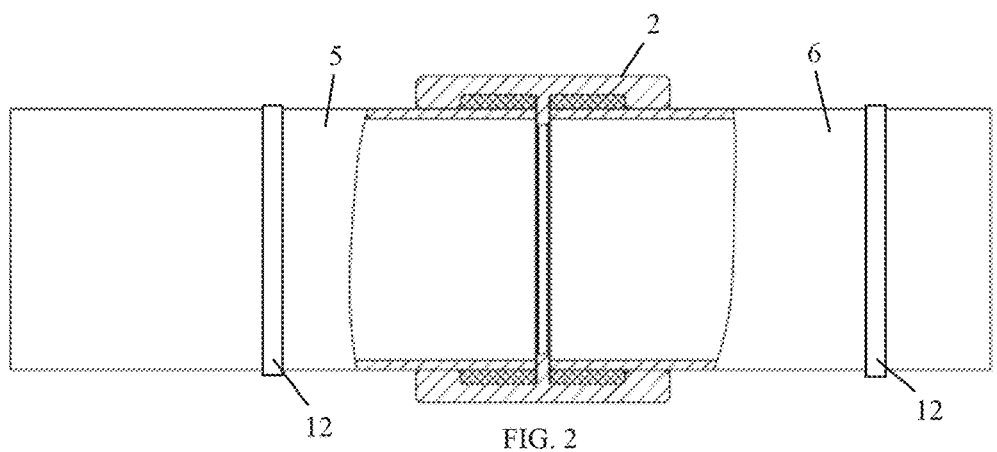
FIG. 2
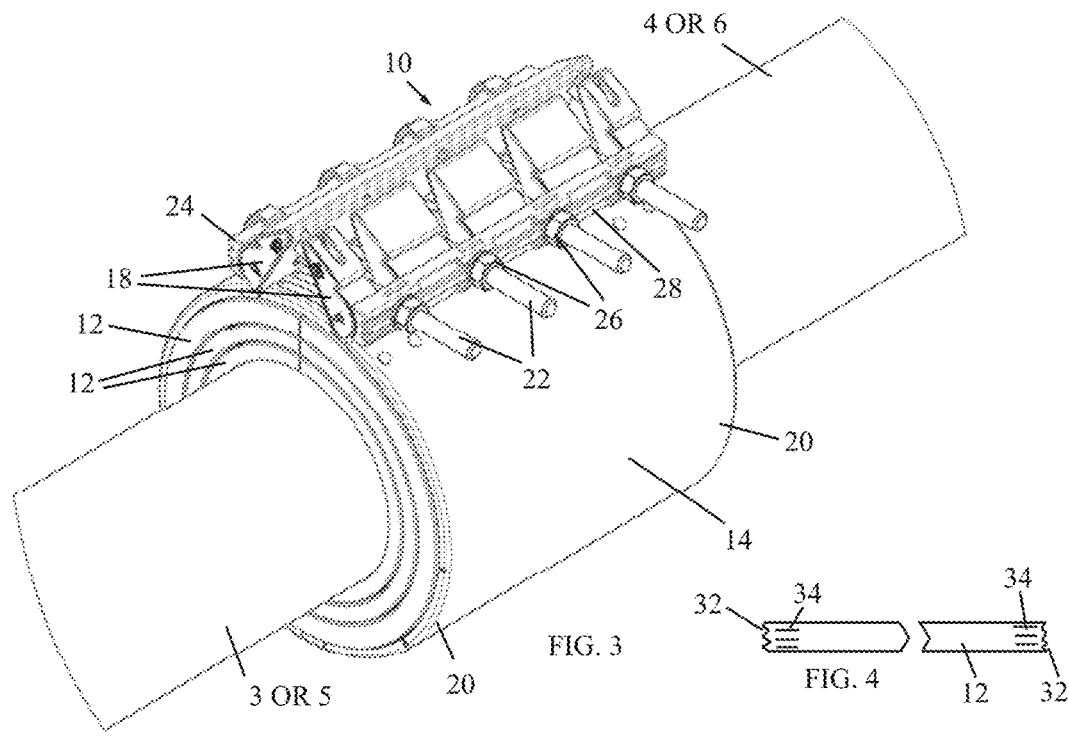
FIG. 3
FIG. 4

METHOD FOR PIPE COUPLING ENCAPSULATION

FIELD OF THE INVENTION

The present invention relates generally to pipe coupling assemblies, such as those used to sealingly connect pipes together or to repair breaks or leaks in pipes, and particularly to methods for pipe coupling encapsulation in which the pipe coupling fits over existing bell-shaped joints and sleeve joints and seals the joint.

BACKGROUND OF THE INVENTION

Many kinds of removable band-type couplings for pipes exist in the art. It is noted that throughout the specification and claims, the term "pipe" encompasses any kind of generally cylindrical object, and the terms "clamp" and "coupling" are used interchangeably.

Pipeline leakage must be prevented for both economic and environmental reasons, depending on the nature of the fluid being transported. When needed repairs are inevitably carried out under field conditions, and in many situations there is a requirement that the flow of fluid in the pipeline may not be interrupted for any reason. Thus replacement of a faulty pipe joint is not an option.

Prior art seals are not capable of being used externally over an existing coupling or existing bell joint. Prior art seals lack the internal space needed if the repair seal is to be applied over and around an existing but leaking pipe joint. A further problem with many prior-art seals arises when the fluid being transported is under high pressure. This results in the seal lips being gradually pushed outwards, eventually leading to complete seal failure.

A solution to the above problems are split seal encapsulation pipe repair assemblies. The encapsulation seal assembly fits over existing bell-shaped joints, sleeve joints and the like, and seals the joint. The encapsulation seal assembly includes two metal half-rings that are bolted together at top and bottom flanges of the half-rings. Two elastomeric sealing half-rings are permanently attached to the inside of the two metal half-rings, and these sealing half-rings are clamped on both sides of the leak to stop the leak.

Another encapsulation seal assembly is described in U.S. Pat. No. 9,551,444. This assembly includes a band having an inner annular seal wrappable around a pipe. The band has opposing clamp members that are clamped together with tightening screws. Retaining elements are assembled in slots formed in the annular seal. The retaining elements have a retaining flap arranged to block outward migration of the annular seal element.

SUMMARY OF THE INVENTION

The present invention seeks to provide an improved method for pipe coupling encapsulation, as is described more in detail further below. Unlike the prior art, in the present invention, the seals on either side of the leak are not permanently attached to the inside of the two metal half-rings or the metal band. Instead, the seal is an elastomeric partial ring that is wrapped or otherwise placed around the pipe or pipes on either side of the leak (e.g., opposite sides of a bell-shaped joints or a sleeve joint). The term "partial ring" as used herein encompasses an incomplete or partial ring (that is, a ring with a gap) or a strip that is wrapped around the pipe and after wrapping assumes the shape of a ring. Afterwards, a metal band of a repair coupling is placed around these rings and tightened, thereby repairing the leak.

There is provided in accordance with an embodiment of the present invention a method for pipe coupling encapsulation including placing two elastomeric partial rings around pipes on opposite sides of a leaking joint coupling, taking a repair coupling, which includes a band and opposing clamp members extending outwards from ends of the band, and placing the band around the leaking joint coupling such that opposite end portions of the band overlie the elastomeric partial rings, and tightening the opposing clamp members towards each other with one or more tightening elements.

Prior to placing the band around the leaking joint coupling, the elastomeric partial rings may be secured to the pipes with an adhesive and/or end portions of the elastomeric partial rings may be secured to each other with male and female connections.

In accordance with an embodiment of the present invention the elastomeric partial rings are formed with annular outer grooves and the band of the repair coupling is provided with an annular seal that extends over the joint coupling, and the method further includes placing the annular seal in the annular outer grooves.

More than one layer of the elastomeric partial rings may be placed around at least one of the pipes.

BRIEF DESCRIPTION OF THE DRAWINGS

The present invention will be understood and appreciated more fully from the following detailed description, taken in conjunction with the drawings in which:

FIG. 1 is a sectional illustration of a bell joint coupling which is repaired by the encapsulation assembly in accordance with a non-limiting embodiment of the present invention, the encapsulation assembly including two elastomeric partial rings, each partial ring wrapped or otherwise placed around pipes on opposite sides of the leaking bell joint coupling;

FIG. 2 is a sectional illustration of a sleeve joint coupling which is repaired by the encapsulation assembly in accordance with a non-limiting embodiment of the present invention, the encapsulation assembly including two elastomeric partial rings, each partial ring wrapped or otherwise placed around pipes on opposite sides of the leaking sleeve joint coupling;

FIG. 3 is a perspective illustration of a pipe coupling encapsulation assembly, constructed and operative in accordance with a non-limiting embodiment of the present invention;

FIG. 4 is a simplified illustration of one of the elastomeric partial rings flattened out, in accordance with a non-limiting embodiment of the present invention;

FIG. 5 illustrates that one of the elastomeric partial rings is formed with an annular outer groove in which an annular seal of the repair clamp of the encapsulation assembly is placed.

DETAILED DESCRIPTION OF EXEMPLARY EMBODIMENTS

Figure 5:
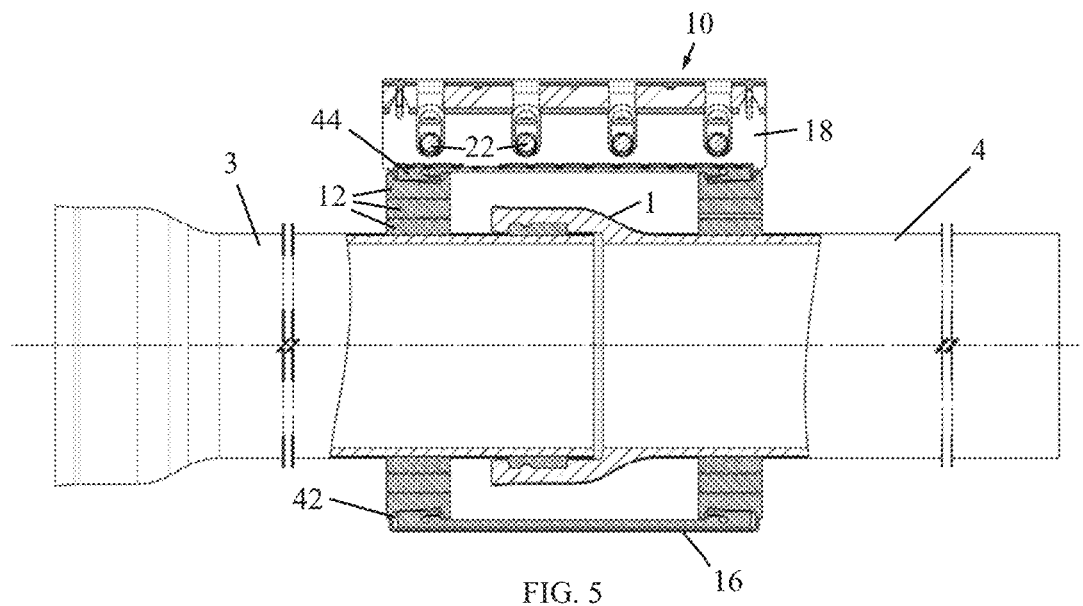
FIG. 5 is a sectional illustration of the bell joint coupling fully repaired by the encapsulation assembly in accordance with a non-limiting embodiment of the present invention.

FIG. 1 illustrates a bell joint coupling 1, which has some leak. The bell joint coupling 1 is at the end of a pipe 4 and is connected to another pipe 3.

Similarly, FIG. 2 illustrates a sleeve joint coupling 2, which has some leak. The sleeve joint coupling 2 may be used to connect pipes 5 and 6.

Reference is now made additionally to FIG. 3. In accordance with a non-limiting embodiment of the present invention, a pipe coupling encapsulation assembly 10 is provided to repair the leaking pipe joints, without having to interrupt flow through the pipes and joint couplings. The pipe coupling encapsulation assembly 10 includes two elastomeric partial rings 12, which may be made of natural or synthetic rubber or other suitable material. Each elastomeric partial ring 12 is wrapped or otherwise placed around one of the pipes on opposite sides of the leaking joint coupling (1 or 2), as shown in FIGS. 1 and 2.

If desired, each elastomeric partial ring 12 may be secured in place on the pipe circumference, such as by adhesive. Additionally or alternatively to the adhesive, the elastomeric partial rings 12 may include connections for connecting the end portions of the partial rings to each other. For example, as seen in FIG. 4, end portions of elastomeric partial ring 12 may be formed with male and female connections, such as tenons and grooves 32 at the end faces of the partial ring 12, or ridges and crevices 34 near the end faces, which mate with each other to fasten the end portions to each other. FIG. 4 shows the ring 12 flattened out; indeed, the ring 12 may be supplied as a strip which is wrapped around the pipe.

As seen in FIG. 3, more than one layer of elastomeric partial rings 12 can be used, one ring placed on top of another ring. Afterwards, a metal band of a repair coupling is placed around these rings and tightened, thereby repairing the leak, as is now explained with reference to FIG. 3.

The pipe coupling encapsulation assembly 10 includes a repair coupling 14. The repair coupling 14 includes a band 16, which is typically, but not necessarily, made of metal. Opposing clamp members 18 extend outwards from ends of band 16. Clamp members 18 are clamped and tightened together with one or more tightening elements 22, such as but not limited to, bolts that pass through a bolt plate 24, and which are tightened by nuts 26 (with optional washers) at a nut plate 28.

In the illustrated embodiment, the band 16 is continuous all around and up to clamp members 18. The band 16 is openable to a wide gap so it can be placed around the pipes 3 and 4 and the elastomeric partial rings 12.

Thus, in use, a worker places the two elastomeric partial rings 12 around the pipes on opposite sides of the leaking joint coupling 1 or 2. The worker takes repair coupling 14 and places band 16 around the leaking joint coupling such that opposite end portions 20 of band 16 overlie elastomeric partial rings 12. The worker than tightens opposing clamp members 18 towards each other with tightening elements 22 and the repair is complete.

It is noted that before tightening the repair coupling 14, the end portions of the elastomeric partial rings 12 may abut against each other, or may have a small gap therebetween, or may slightly overlap each other. In any case, tightening the repair coupling 14 squeezes the elastomeric partial rings 12 against the pipes and achieves a proper hydraulic seal.

Figure 6:
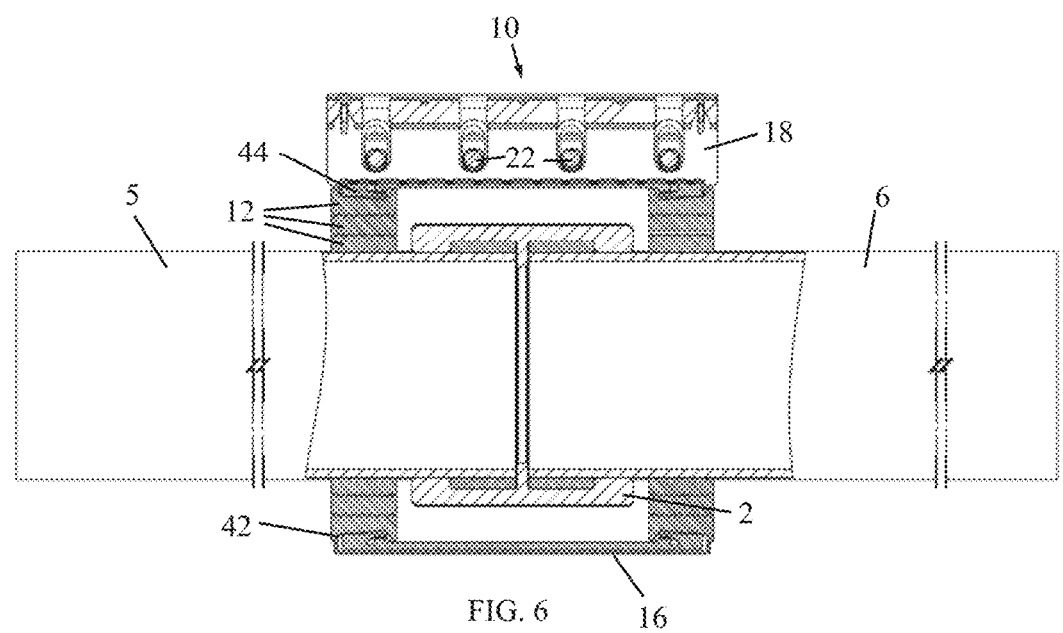
FIG. 6 is a sectional illustration of the sleeve joint coupling fully repaired by the encapsulation assembly in accordance with a non-limiting embodiment of the present invention.

FIGS. 5 and 6 illustrate the bell joint coupling 1 and the sleeve joint coupling 2, respectively, after being fully repaired by the encapsulation assembly. It is seen that the band 16 of the repair coupling may be provided with an annular seal 44 (although in other embodiments, the repair coupling has no annular seal). One of the elastomeric partial rings 12 may be formed with an annular outer groove 42 in which the annular seal 44 is placed.

What is claimed is:

1. A method for pipe coupling encapsulation comprising:
    placing two elastomeric partial rings around pipes on opposite sides of a leaking joint coupling;
    taking a repair coupling, which comprises a band and opposing clamp members extending outwards from ends of said band, and placing said band around said leaking joint coupling such that opposite end portions of said band overlie said elastomeric partial rings; and
    tightening said opposing clamp members towards each other with one or more tightening elements;
    wherein said band of said repair coupling is provided with an annular seal and the method comprises placing said annular seal over said elastomeric partial rings, and wherein said elastomeric partial rings are formed with annular outer grooves, and the method further comprises placing said annular seal in said annular outer grooves.

2. The method according to claim 1, wherein prior to placing said band around said leaking joint coupling, end portions of said elastomeric partial rings are secured to each other with male and female connections.

3. The method according to claim 1, wherein the joint coupling is a bell joint coupling.

4. The method according to claim 1, wherein the joint coupling is a sleeve joint coupling.

5. A method for pipe coupling encapsulation comprising:
    placing two elastomeric partial rings around pipes on opposite sides of a leaking joint coupling;
    taking a repair coupling, which comprises a band and opposing clamp members extending outwards from ends of said band, and placing said band around said leaking joint coupling such that opposite end portions of said band overlie said elastomeric partial rings; and
    tightening said opposing clamp members towards each other with one or more tightening elements; and
    comprising placing more than one layer of said elastomeric partial rings on at least one of the pipes.

6. The method according to claim 5, wherein prior to placing said band around said leaking joint coupling, end portions of said elastomeric partial rings are secured to each other with male and female connections.

7. The method according to claim 5, wherein the joint coupling is a bell joint coupling.

8. The method according to claim 5, wherein the joint coupling is a sleeve joint coupling.

\* \* \* \* \*